US008632872B2

(12) United States Patent
Ichikawa et al.

(10) Patent No.: US 8,632,872 B2
(45) Date of Patent: Jan. 21, 2014

(54) CERAMIC HONEYCOMB STRUCTURE

(75) Inventors: Yukihito Ichikawa, Nagoya (JP);
Yasushi Noguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 333 days.

(21) Appl. No.: 12/718,123

(22) Filed: Mar. 5, 2010

(65) Prior Publication Data

US 2010/0247853 A1 Sep. 30, 2010

(30) Foreign Application Priority Data

Mar. 26, 2009 (JP) ................................. 2009-076207

(51) Int. Cl.
*B32B 3/12* (2006.01)
(52) U.S. Cl.
USPC ........... 428/116; 428/689; 428/698; 422/180; 55/523
(58) Field of Classification Search
USPC ............................. 428/116; 422/180; 55/523
See application file for complete search history.

(56) References Cited

U.S. PATENT DOCUMENTS

| | | | |
|---|---|---|---|
| 5,494,881 A | 2/1996 | Machida et al. | |
| 2003/0045422 A1 | 3/2003 | Tanaka et al. | |
| 2003/0100434 A1* | 5/2003 | Yoshitomi et al. | 501/9 |
| 2003/0110744 A1* | 6/2003 | Gadkaree et al. | 55/523 |
| 2004/0170803 A1* | 9/2004 | Ichikawa | 428/116 |
| 2004/0266617 A1 | 12/2004 | Fujii et al. | |
| 2006/0154021 A1* | 7/2006 | Ohno et al. | 428/116 |
| 2006/0280905 A1* | 12/2006 | Ichikawa | 428/116 |
| 2007/0212517 A1* | 9/2007 | Ohno et al. | 428/116 |
| 2007/0292657 A1* | 12/2007 | Sorensen et al. | 428/116 |
| 2008/0138567 A1* | 6/2008 | Ninomiya et al. | 428/116 |
| 2008/0292513 A1* | 11/2008 | Miyairi | 428/116 |
| 2009/0131253 A1 | 5/2009 | Fujii et al. | |

FOREIGN PATENT DOCUMENTS

| | | |
|---|---|---|
| JP | 07-039760 A1 | 2/1995 |
| JP | 2002-346383 A | 12/2002 |
| JP | 2003-154264 A | 5/2003 |
| JP | 2005-144343 A1 | 6/2005 |
| JP | 2007-021483 A1 | 2/2007 |

OTHER PUBLICATIONS

Japanese Office Action, Japanese Patent Application 2009-076207, dated Jul. 31, 2012 (2 page).
Japanese Office Action dated Apr. 16, 2013.

* cited by examiner

*Primary Examiner* — David Sample
*Assistant Examiner* — Nicholas W Jordan
(74) *Attorney, Agent, or Firm* — Burr & Brown, PLLC

(57) ABSTRACT

There is provided a ceramic honeycomb structure usable as a catalyst substrate and being improved warm-up properties and thermal insulation properties, and being excellent in exhaust gas purification performance; by employing larger heat capacity and larger thermal conductivity compared with a material of the partition walls in at least one of insides and surfaces of the respective partition walls.

3 Claims, 1 Drawing Sheet

CERAMIC HONEYCOMB STRUCTURE

FIELD OF THE INVENTION

The present invention relates to a honeycomb structure made of a ceramic material and used as a filter or a catalyst substrate.

BACKGROUND OF THE INVENTION

A honeycomb structure made of a ceramic material (hereinafter referred to as the ceramic honeycomb structure) is broadly used as a catalyst substrate, various types of filters, an adsorber, an absorber and the like. As to this ceramic honeycomb structure, in recent years, with the stricter regulation on an exhaust gas, various attempts to improve a purification performance have been made.

For example, in the ceramic honeycomb structure used as a catalyst substrate for an oxide catalyst system or three way catalyst system in which harmful substances in the exhaust gas discharged from a car, such as hydrocarbons (HC), carbon monoxide (CO) and nitrogen oxide (NOx) are purified, attempts to improve the catalyst activity at an early stage are made by reducing the thicknesses of partition walls to decrease a heat capacity, and then rapidly raising the temperature of a catalyst immediately after the engine starting. Moreover, attempts to exert a desired exhaust gas purification performance immediately are made by increasing the number of cells to large contact area between the exhaust gas and the catalyst. Furthermore, attempts to improve the catalyst activity are also made by increasing the porosities of the partition walls to decrease the heat capacity. Studies on the combinations of the thicknesses and porosities of the partition walls have been actively conducted. Incidentally, it is to be noted that examples of prior art documents include Patent Documents 1, 2.

[Patent Document 1] JP-A-H7-39760
[Patent Document 2] JP-A-2007-021483

SUMMARY OF THE INVENTION

The regulations on the exhaust gas will further become stricter in future, and accordingly the ceramic honeycomb structure as the catalyst substrate of the oxide catalyst or three way catalyst has been also required to further improve the purification performance by increasing the catalyst activity. In recent years, warm-up properties at the engine starting or thermal insulation properties at the engine stopping or moving at low-speed have been becoming more important.

The present invention has been developed in view of demands accompanied by the development of such a catalyst technology, and an object thereof is to provide the ceramic honeycomb structure which is superior in exhaust gas purification performance by improving the warm-up properties and thermal insulation properties of a ceramic honeycomb structure used as a catalyst substrate. As a result of extensive studies, it has been found that the above object can be attained by the following ceramic honeycomb structure.

That is, according to the present invention, there is provided a ceramic honeycomb structure comprising: porous partition walls which form a plurality of cells as through channels for a fluid; and an outer wall which surrounds the partition walls, wherein one or both of the insides and surfaces of the partition walls contain a substance having larger heat capacity and larger thermal conductivity compared with a material of the partition walls.

In the present description, the thermal conductivity (unit: W/mK) is measured together with specific heat by a laser flash method. The porosity is measured by a mercury porosimeter.

In the ceramic honeycomb structure according to the present invention, the material of the partition walls is cordierite, and a melting point of the above substance (having larger heat capacity and larger thermal conductivity compared with the material of the partition walls) is higher than that of cordierite (having a melting point of 1455° C.) and is preferably 1600° C. or more. The melting point of the above substance is more preferably 1900° C. or more.

Cordierite is formed by firing the ceramic material obtained by blending 42 to 56 mass % of silica, 30 to 45 mass % of alumina and 12 to 16 mass % of magnesia in these chemical composition ranges.

The ceramic honeycomb structure according to the present invention further comprises plugging portions which plug open areas of predetermined cells in one end face side and open areas of the residual cells in the other end face side among the plurality of cells, and the plugging portions are preferably provided so that the predetermined cells (those plugged at open areas in the one end face side) and the residual cells (those plugged at open areas in the other end face side) are alternately disposed. This is the ceramic honeycomb structure having an embodiment in which when the end faces of the structure are seen, the plugging portions seem to be disposed in a zigzag or checkered pattern.

In the ceramic honeycomb structure according to the present invention, one or both of the insides and surfaces of the partition walls contain the substance having larger heat capacity and larger thermal conductivity compared with the material of the partition walls. Therefore, when the ceramic honeycomb structure is used as a catalyst substrate, warm-up properties and thermal insulation properties are improved, and an exhaust gas purification performance is excellent. Hereinafter, the effect of the ceramic honeycomb structure according to the present invention will be described in more detail.

FIG. 2 is a chart showing U.S. typical exhaust gas regulation mode. The exhaust gas regulation mode shown in FIG. 2 is roughly constituted of three phases which simulate city driving. A first phase of the three phases is a cold start phase involving cold start for starting an engine from a state in which the engine as well as the catalyst is cooled sufficiently by being kept under ambient temperature condition. The next phase is a transient phase during which minor, but frequent speed change is made. After this phase, there is a hot start phase involving hot start for restarting the engine from a state in which the engine as well as the catalyst is cooled to a certain degree by stopping the engine once for ten minutes (hot soak). Most of the hydrocarbons which are one of emissions in the exhaust gas are discharged at a phase where the catalyst is cooled and has a low activity. Therefore, in the phases of the cold start and the hot start where the engine stops to cool the catalyst, a way of rapidly activating the catalyst is important. At the cold start, the catalyst is in ambient temperature state, and hence it is important to warm the catalyst as soon as possible. The catalyst substrate is required to have characteristics that the substrate easily warms (the warm-up properties), which means that the catalyst substrate is required to have a small heat capacity and which also means that the density and specific heat of the material for forming the ceramic honeycomb structure are important indexes. This also applies to at the hot start. There are means for decreasing the thicknesses of the partition walls of the ceramic honeycomb structure as the devices for decreasing the density of the structure. The viewpoint of the early activation of the catalyst is not limited to the use application of a catalyst converter for exhaust gas purification, but also applies to a catalyst used in a chemical reaction device using various catalysts, for example, a reformer for a fuel cell, or an adsorber or absorber of hydrogen, carbon dioxide or the like. Moreover, when the vehicle speed frequently varies as in the vehicle speed transient phase, for example, during idling, the temperature of the exhaust gas decreases, and the temperature of the catalyst also decreases, although the degree of the temperature decrease is not as much as that at the cold start or the hot start. Therefore, the catalyst activity also lowers to a considerable degree, and it is important to keep the catalyst temperature as high as possible. Furthermore, after the vehicle speed transient phase, when the engine is stopped once for ten minutes (hot soak), the catalyst is cooled, although the degree of the cooling is not as much as that at the cold start. Therefore, it is important to suppress the temperature decrease of the catalyst as much as possible in this cooling phase in the viewpoint of the early activation of the catalyst at the hot start. From such a viewpoint, the ceramic honeycomb structure is required to have characteristics that the structure is not easily cooled, which means that the thermal conducting characteristics (the thermal conductivity) of the material for forming the ceramic honeycomb structure are important indexes. On the other hand, from the design aspect of engine exhaust, there have been employed such devices that the converter holding the ceramic honeycomb structure loaded with the catalyst is disposed (close-coupled) in the vicinity of the engine where the temperature of the exhaust gas is comparatively high and the pulsation of the exhaust gas of the engine is easily received in order to warm the catalyst as soon as possible at the time of engine starting. Alternatively, there have been employed such devices that piping of the exhaust gas to be introduced into the converter is insulated and kept to be warm so that the temperature of the exhaust gas does not decrease as much as possible. Therefore, not only a heat resistance but also a thermal shock resistance is important characteristics in the ceramic honeycomb structure. Moreover, the thermal shock resistance of this ceramic honeycomb structure can be grasped by making the thermal expansion characteristics of the material as an index.

In addition to the above circumstances, in a case where the ceramic honeycomb structure is used as a filter for collecting and removing particulate matters (PM) included in dust containing fluid such as the exhaust gas discharged from a diesel engine, for example, a diesel particulate filter (DPF), in recent years, attempts to remove not only the PM but also harmful substances such as HC, CO and NOx by the catalytic function with the DPF have actively been made. Therefore, also in the DPF, the warm-up properties at the engine starting and the thermal insulation properties at the engine stopping or moving at low-speed are important in the same manner as in the above catalyst substrate of the oxide catalyst or the three way catalyst.

Under such circumstance, in the ceramic honeycomb structure according to the present invention, one or both of the insides and surfaces of the partition walls contain a substance having larger heat capacity and larger thermal conductivity compared with the material of the partition walls. At the engine starting, the substance having larger heat capacity and larger thermal conductivity compared with the material of the partition walls rapidly takes in heat from the exhaust gas to raise the temperatures of the surrounding partition walls at the early stage, thereby, the warm-up properties of the ceramic honeycomb structure improve, which contributes to the early activation of the catalyst. The present partition walls themselves have a small heat capacity and a small thermal conductivity, and hence the heat taken in by the above substance rapidly warms the surrounding partition walls. When the ceramic honeycomb structure is used as the catalyst substrate of the oxide catalyst or three way catalyst, the above substance is preferably dispersed in the surfaces of the partition walls. This is because the heat from the exhaust gas is easily received. Moreover, when the ceramic honeycomb structure is used as the DPF, the substance is preferably dispersed in not only the surfaces of the partition walls but also the surfaces of inner pores of the partition walls. This is because the heat from the exhaust gas is easily received.

In the ceramic honeycomb structure according to the present invention, one or both of the insides and surfaces of the partition walls contain the substance having larger heat capacity and larger thermal conductivity compared with the material of the partition walls. At the engine stopping or moving at low-speed when the temperature of the exhaust gas decreases, the substance having larger heat capacity and larger thermal conductivity compared with the material of the partition walls takes in the heat from the exhaust gas, whereby the heat is released from the substance to the surrounding partition walls to alleviate the temperature decrease of the surrounding partition walls. Therefore, the thermal insulation properties of the present ceramic honeycomb structure improve, which contributes to the early activation of the catalyst at the hot start. Since the present partition walls themselves have the small heat capacity and the small thermal conductivity, the heat released from the substance hardly escapes from the surrounding partition walls, when warming the surrounding partition walls.

In a preferable embodiment of the ceramic honeycomb structure according to the present invention, the material of the partition walls is cordierite, and from the viewpoints of the small heat capacity, small thermal expansion coefficient and small thermal conductivity, the structure is suitable as the catalyst substrate. Moreover, the melting point of the above substance (having larger heat capacity and larger thermal conductivity compared with the material of the partition walls) is higher than that of cordierite and is 1600° C. or more. Therefore, the substance does not noticeably change the properties of the partition walls by reacting with them, and stable characteristics as the catalyst substrate can be kept.

The ceramic honeycomb structure according to the present invention has a capability of taking in and retaining the heat as described above. Therefore, in a case where the ceramic honeycomb structure is disposed (close-coupled), for example, in the vicinity of the engine where the temperature of the exhaust gas is comparatively high and the pulsation of the exhaust gas of the engine is easily received, or in a case where the ceramic honeycomb structure is used as the DPF and is exposed to an abnormally high temperature owing to rapid PM burning at the time of excessive PM deposition, the structure also have an effect of suppressing a locally high temperature, and is excellent in durability.

The ceramic honeycomb structure according to the present invention is naturally made of the ceramic material, and hence the structure is, as compared with the metal material, excellent in heat resistance as well as oxidation resistance, is light and has low density. In addition, the porosity of the structure can comparatively easily be increased, and hence the mass thereof can further be decreased. The structure is suitable for the use applications of the catalyst substrate and DPF.

DETAILED DESCRIPTION OF THE INVENTION

Figure 1:
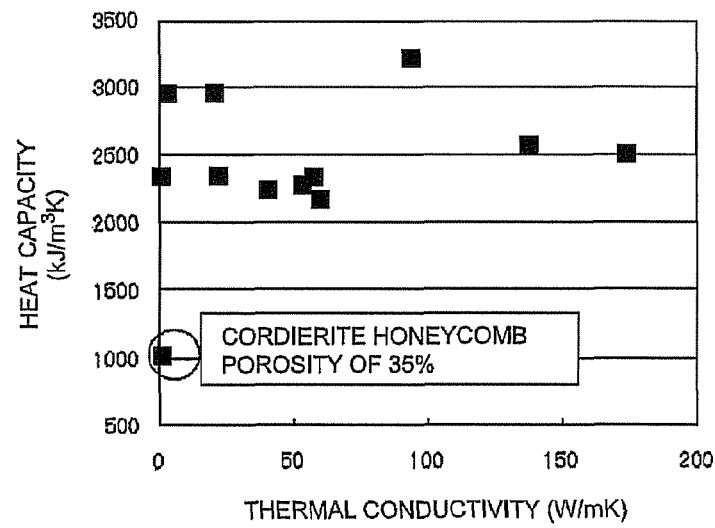
FIG. 1 is a graph showing a relation between a heat capacity and a thermal conductivity concerning materials and cordierite shown in Table 2, and a graph indicating that cordierite has a small heat capacity and a small thermal conductivity as compared with the materials shown in Table 2.
Figure 2:
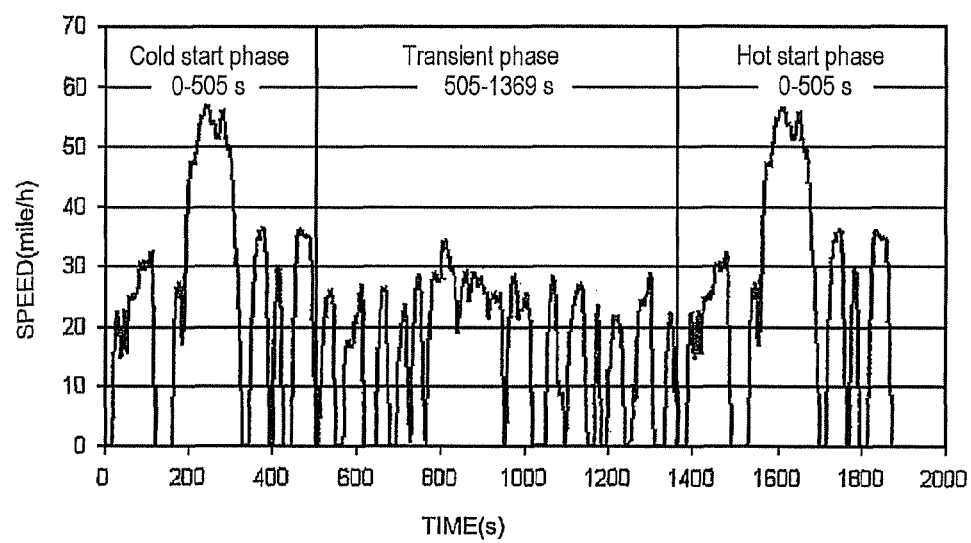
FIG. 2 is a chart showing U.S. typical exhaust gas regulation mode, and a chart indicating the changes of a vehicle speed at a cold start phase, a vehicle speed transient phase and a hot start phase.

Hereinafter, an embodiment of the present invention will be described appropriately with reference to the drawings, but the present invention should not be limited to the embodiment. Various alterations, modifications, improvements and replacements may be added based on the knowledge of a person with ordinary skill without departing from the scope according to the present invention. For example, the drawings show a preferable embodiment according to the present invention, but the present invention is not restricted by any embodiment or information shown in the drawings. To carry out or verify the present invention, means similar or equivalent to those described in the present description can be applied, but preferable means are as follows.

First, a ceramic honeycomb structure according to the present invention will be described. The ceramic honeycomb structure according to the present invention comprises porous partition walls which form a plurality of cells as through channels for a fluid, and an outer wall which surrounds the partition walls. The outer shape of the structure is, for example, a columnar shape, and the sectional shape thereof in a direction vertical to a central axis direction is often circle, and may be ellipse or oval. Furthermore, in the ceramic honeycomb structure according to the present invention, one or both of the insides and surfaces of the partition walls contain a substance having larger heat capacity and larger thermal conductivity compared with a material of the partition walls.

From the viewpoints of a heat resistance and a small heat capacity, the material of the partition walls of the ceramic honeycomb structure according to the present invention is preferably one material or a compound of two or more materials selected from the group consisting of cordierite, alumina, mullite, lithium aluminum silicate, aluminum titanate, silica, titania, magnesia, zirconia, silicon nitride, aluminum nitride and silicon carbide. Among these materials, cordierite or aluminum titanate is further preferable from the viewpoints of a thermal shock resistance and a small thermal conductivity. Moreover, from the viewpoints of the small heat capacity and mass productivity, cordierite is especially preferable.

The heat capacity [J/K] is a product of the mass [kg] and the specific heat [J/kgK], and hence the heat capacity per unit volume [J/m$^3$K] can be represented by a product of the density [kg/m$^3$] and the specific heat [J/kgK]. In the case of a porous body having high porosity, the density is represented by a bulk density in consideration of the porosity. The bulk density is calculated by density×(1-porosity). When the density of cordierite is, for example, 2520 [kg/m$^3$] and the porosity thereof is 35%, the bulk density is 1640 [kg/m$^3$]. Table 1 shows characteristics of typical ceramic materials and heat-resistant metal materials. The heat capacity of the ceramic material is very small, and is about from ¼ to ½ of that of the metal material. Furthermore, it is noted that cordierite has the smallest heat capacity, thermal expansion coefficient and thermal conductivity among the ceramic materials and that cordierite is the most balanced material as the ceramic honeycomb structure used as a catalyst substrate.

TABLE 1

| Material | Density (kg/m$^3$) | Porosity (%) | Bulk density (kg/m$^3$) | Specific heat (J/kgK) | Heat capacity (kJ/m$^3$K) | Thermal expansion coefficient (×10$^{-6}$/° C.) | Thermal conductivity (W/mK) |
|---|---|---|---|---|---|---|---|
| Cordierite | 2520 | 35 | 1638 | 620 | 1016 | <1 | 1 |
| Aluminum titanate | 3600 | 35 | 2340 | 650 | 1521 | <1 | 1 |
| Alumina | 3700 | 35 | 2405 | 800 | 1924 | 8 | 20 |
| Silicon carbide | 3100 | 35 | 2015 | 700 | 1411 | 4 | 60 |
| Ferritic stainless steel | 7800 | 0 | 7800 | 460 | 3588 | 10 | 27 |

One example of the substances (hereinafter referred to as the substances having large heat capacity and large thermal conductivity) having larger heat capacity and larger thermal conductivity as compared with the material of the partition walls is shown in Table 2 and FIG. 1. It is to be noted that FIG. 1 also shows cordierite for comparison. Thus, one may confirm that a relative small heat capacity and thermal conductivity of cordierite.

TABLE 2

| Material | Melting point (° C.) | Density (kg/m$^3$) | Specific heat (J/kgK) | Heat capacity (kJ/m$^3$K) | Thermal conductivity (W/mK) |
|---|---|---|---|---|---|
| Titanium | 1668 | 4507 | 520 | 2344 | 22 |
| Chromium | 1903 | 7150 | 450 | 3218 | 94 |
| Niobium Nb | 2477 | 8570 | 265 | 2271 | 54 |
| Molybdenum Mo | 2623 | 10280 | 250 | 2570 | 138 |
| Tantalum Ta | 3017 | 16650 | 140 | 2331 | 58 |
| Tungsten W | 3422 | 19250 | 130 | 2503 | 174 |
| Aluminum titanate | 1820 | 3600 | 650 | 2340 | 1 |
| Silicon nitride | 1900 | 3200 | 700 | 2240 | 40 |
| Alumina | 2050 | 3700 | 800 | 2960 | 20 |
| Zirconia | 2700 | 5900 | 500 | 2950 | 3 |
| Silicon carbide | 3000 | 3100 | 700 | 2170 | 60 |

There is not any special restriction on a substance used as the substance having large heat capacity and large thermal conductivity in the ceramic honeycomb structure according to the present invention, but the substance is preferably one material selected from the group consisting of titanium, chromium, niobium, molybdenum, tantalum and tungsten, an alloy material containing the material as a main component, or a composite material of two or more materials selected from the group. Alternatively, the substance is preferably one material selected from the group consisting of aluminum titanate, alumina, zirconia, silicon nitride and silicon carbide, an alloy material containing the material as a main component, or a composite (ceramic) material of two or more materials selected from the group. Furthermore, from the viewpoint of a large thermal conductivity, the substance is preferably one material selected from the group consisting of chromium, molybdenum and tungsten, or a composite material of two or more materials selected from the group. In addition, the substance is preferably one material selected from the group consisting of silicon nitride and silicon carbide, or a composite (ceramic) material of them. Examples of a commercially available alloy material include chromium molybdenum steel and tungsten carbide.

There is not any special restriction on the content of the substance having large heat capacity and large thermal conductivity in the partition walls of the ceramic honeycomb structure according to the present invention, but the upper limit of the content with respect to the mass of the partition walls is preferably 90 mass % or less, further preferably 70 mass % or less, especially preferably 40 mass % or less. The heat capacity excessively increases, as the content is large. Therefore, the improvement of warm-up properties shows a tendency that it almost reaches the maximum level. If the content further becomes large, the influence of the thermal expansion of the contained substance is increased to lower the thermal shock resistance of the ceramic honeycomb structure. The lower limit of the content is preferably 0.05 mass % or more, further preferably 0.1 mass % or more, especially preferably 5 mass % or more. If the content is less than 0.05 mass %, the effect of the present invention is not sufficiently obtained.

There is not any special restriction on the containing morphology of the substance having large heat capacity and large thermal conductivity, and the morphology may be a particulate morphology, a filamentous morphology or the like, but the particulate morphology is preferably in order to mix with the ceramic material of the partition walls. There is not any special restriction on the size of the substance having large heat capacity and large thermal conductivity, and the size can appropriately be determined in accordance with the thicknesses of the partition walls. The external dimensions of the particulate morphology are preferably 80% or less, further preferably 50% or less, especially preferably 30% or less with respect to the thickness of each partition wall. There is not any special restriction on the containing distribution of the substance, but it is preferable to broadly and uniformly disperse the substance having the appropriate size over the whole partition walls in order to make the substances contain in the insides and surfaces of the partition walls. Moreover, the substance having large heat capacity and large thermal conductivity is dispersed and mixed in a slurry of the substance having large heat capacity and large thermal conductivity or a slurry of the main component of the ceramic material of the partition walls, to coat the surfaces of the partition walls of the ceramic honeycomb structure with the slurry, whereby the substance having large heat capacity and large thermal conductivity can be dispersed and contained in the surfaces of the partition walls.

The ceramic honeycomb structure of the present invention is preferably used when the thicknesses of the partition walls are 600 µm or less. If the thicknesses of the partition walls decrease, the partition walls are easily cracked. Therefore, in a ceramic honeycomb structure in which the thicknesses of the partition walls are 600 µm or less and which is easily cracked, the ceramic honeycomb structure of the present invention brings about a large thermal shock resistance improving effect.

There is not any special restriction on the shape of the ceramic honeycomb structure according to the present invention except that the outer shape thereof is a columnar shape. Examples of the sectional shape of the structure in a direction vertical to a central axis direction include polygonal shapes such as a triangular and a quadrangular, a circular, an elliptic, an oval and an irregular. Moreover, the side surface of the columnar shape may have a V-shaped curving shape.

There is not any special restriction on the sectional shape of each cell in the ceramic honeycomb structure according to the present invention (sectional shape of the cell in the direction vertical to the central axis direction of the ceramic honeycomb structure), and a triangular, a quadrangular, a hexagonal, an octagonal, a circular or a combination of them may be employed. For example, a combination of the octagonal and the quadrangular may be used. Furthermore, all the cells do not need to have an equal sectional area of each cell (the sectional area of each cell (open area at end face) in the direction vertical to the central axis direction of the ceramic honeycomb structure), and cells having different open areas may be mixedly present.

A preferable embodiment of the ceramic honeycomb structure according to the present invention (in a case where the structure is used as a DPF) comprises plugging portions which plug open areas of predetermined cells in one end face side and open areas of the residual cells in the other end face side among the plurality of cells, and the plugging portions are provided so as to alternately dispose the predetermined cells and the residual cells. That is, the plugging portions are preferably formed in a zigzag pattern.

However, the plugging pattern of the plugging portions is not limited to this zigzag pattern. There may be used, for example, a constitution in which a plurality of plugged cells are assembled while a plurality of unplugged cells are assembled, or a constitution in which plugged cell passages are assembled in a row while unplugged cell passages are also assembled in a row. Alternatively, the plugging portions may concentrically or radially be arranged. Furthermore, various patterns can be realized in accordance with the cell sectional shape.

In the ceramic honeycomb structure according to the present invention, there is not any special restriction on a cell density. However, if the cell density is excessively small, the strength and the effective geometric surface area (GSA) run short sometimes when the ceramic honeycomb structure is used as a filter. If the cell density is excessively large, the pressure loss during the flow of a fluid to be treated increases sometimes. The cell density is in a range of preferably 6 to 2000 cells/square inch (0.9 to 311 cells/cm$^2$), further preferably 50 to 1000 cells/square inch (7.8 to 155 cells/cm$^2$), especially preferably 100 to 600 cells/square inch (15.5 to 93.0 cells/cm$^2$).

In the embodiment of the ceramic honeycomb structure having the plugging portions according to the present invention, there is not any special restriction on the thicknesses of the plugging portions, that is, the lengths (depths) of the plugging portions in the long axis direction of the ceramic honeycomb structure, but the lengths are preferably from 1 to 20 mm. If the lengths are smaller than 1 mm, the strength of the plugging portions remarkably decreases sometimes. If the lengths are larger than 20 mm, the pressure loss increases sometimes in the structure used as the filter. The thicknesses of the plugging portions are further preferably from 2 to 10 mm, especially preferably from 3 to 7 mm.

Next, a method for manufacturing the ceramic honeycomb structure according to the present invention (also referred to as the manufacturing method of the ceramic honeycomb structure) will be described. In the manufacturing method of the ceramic honeycomb structure according to the present invention, first a forming material for forming a ceramic honeycomb-like formed body (referred to as the ceramic honeycomb formed body) is prepared. As a main forming material, it is preferable to use a composition including 0 to 20 mass % of kaolin ($Al_2O_3 \cdot 2SiO_2 \cdot 2H_2O$), 37 to 40 mass % of talc ($3MgO \cdot 4SiO_2 \cdot H_2O$), 15 to 45 mass % of aluminum hydroxide, 0 to 15 mass % of aluminum oxide and 10 to 20 mass % of molten silica or quartz as a cordierite forming raw material which is excellent because of its small heat capacity, small thermal expansion coefficient and small thermal conductivity.

In the manufacturing method of the ceramic honeycomb structure according to the present invention, a desired additive may be added to the ceramic material as the above main forming material if needed. Examples of the additive include a binder, a dispersant for promoting dispersion in a medium solution, and a pore former for forming pores.

Examples of the binder include hydroxypropyl methylcellulose, methylcellulose, hydroxyethylcellulose, carboxyl methylcellulose, polyvinyl alcohol and polyethylene terephthalate. Examples of the dispersant include ethylene glycol, dextrin, fatty acid soap and polyalcohol.

In the manufacturing method of the ceramic honeycomb structure according to the present invention, 0.1 to 50 parts by mass of the predetermined substance having large heat capacity and large thermal conductivity is added to 100 parts by mass of the mixed material powder of the above main material and the additive added if needed, and the resultant material is introduced into a mixer to disperse and mix uniformly.

Next, about 10 to 40 parts by mass of water is added to 100 parts by mass of the mixed material powder of the main material and additives optionally added, followed by kneading, to form a mixture having plasticity.

Next, thus obtained mixture having plasticity is formed to obtain the ceramic honeycomb formed body. As a forming method, extrusion may be used. This extrusion can be conducted by using a vacuum clay kneader, a ram type extruder, a biaxial screw type continuous extruder or the like.

Next, the resultant ceramic honeycomb formed body is dried. As a method for drying the ceramic honeycomb formed body, various methods may be used, and examples of the method include hot air drying, microwave drying, dielectric drying, reduced-pressure drying, vacuum drying, freeze drying, and far infrared drying. Especially, the body is preferably dried by a combined method of the microwave drying and hot air drying or a combined method of the dielectric drying and hot air drying. Drying conditions are preferably from 30 to 150° C. for one minute to two hours. Afterward, both end faces of the ceramic honeycomb formed body dried in this manner are cut into a predetermined length. Then, the ceramic honeycomb formed body is fired to manufacture the ceramic honeycomb structure according to the present invention. Examples of a method for firing the ceramic honeycomb formed body include a method for raising the temperature to 1350 to 1450° C. under the atmosphere to fire the body.

Next, the manufacturing method of the ceramic honeycomb structure (used as the DPF) having both end faces plugged in the zigzag pattern will be described. First, a plugging material for forming the plugging portions to plug the open ends of the cells is prepared. The plugging material for forming the plugging portions can be obtained by mixing the ceramic material, a surfactant, water, a sintering agent and the like, adding the pore former thereto to increase the porosity if needed, to obtain slurried material, and kneading the resultant slurried material by use of a mixer or the like.

As the plugging material, in addition to the above ceramic material, methylcellulose, hydroxypropoxyl methylcellulose, polyethylene oxide, hydroxypropyl methylcellulose, hydroxyethylcellulose, carboxyl methylcellulose, polyvinyl alcohol or the like may be added. As the material of the plugging portions, the same material as that of the partition walls is preferably used.

There is not any special restriction on the kind of the surfactant, but examples of the surfactant include ethylene glycol, dextrin, fatty acid soap and polyalcohol. The pore former may be added to increase the porosity if needed. There is not any special restriction on the pore former as long as the pore former has such properties that it evaporates and disappears in a firing process, and an inorganic material such as a coke, a resin balloon, a polymer compound such as a water absorbing resin, an organic substance such as starch or the like may be used alone or as a combination of them.

Moreover, in one end face of the ceramic honeycomb formed body, the open ends of predetermined cells (a part of the cells) are masked, and the masked end face is dipped in a storage container in which the plugging material is stored, whereby the plugging material is filled up in the cells which are not masked, to form the plugging portions. Afterward, in the other end face of the ceramic honeycomb formed body, the open ends of the cells which are not masked in the one end face (the residual cells other than the predetermined cells) are masked, and the masked end face is dipped in the storage container in which the plugging material is stored, whereby the plugging material is filled up in the cells which are not masked, to form the plugging portions. At this time, the cells provided with the plugging portions and the cells which are not provided with the plugging portions are alternately arranged, and the plugging material is filled up in the zigzag pattern so as to form checkered patterns in both the end faces.

There is not any special restriction on a method for masking the open ends of the cells, but in an example of the method, an adhesive film is attached to the whole end face of the ceramic honeycomb formed body, and holes are made in a part of the adhesive film. In a preferable example of the method, after attaching the adhesive film to the whole end face of the ceramic honeycomb formed body, holes are made in only portions corresponding to the cells to be provided with the plugging portions by laser. As the adhesive film, a film made of polyester, polyethylene, a resin such as a thermosetting resin or the like and having one surface thereof coated with an adhesive may preferably be used.

Next, the ceramic honeycomb formed body having both the end faces thereof plugged in the zigzag pattern is dried at, for example, 40 to 250° C. for two minutes to two hours. When this ceramic honeycomb formed body is fired, the ceramic honeycomb structure having the plugging portions according to the present invention can be obtained. In an example of a method for firing the ceramic honeycomb formed body, the temperature is raised to, for example, 1350 to 1450° C. under the atmosphere to fire the body.

In the manufacturing method of the ceramic honeycomb structure, the ceramic honeycomb formed body may once be fired before plugged. After the firing, the ceramic honeycomb structural fired body may be plugged, followed by the firing of the plugging portions, thereby manufacturing the ceramic honeycomb structure.

EXAMPLES

Hereinafter, the present invention will specifically be described with respect to examples, but the present invention is not limited to these examples.

Examples 1 to 3, Comparative Example 1

To powder of a cordierite forming raw material, 0.1 mass % (Example 1), mass % (Example 2) or 10 mass % (Example 3) of tungsten carbide or nothing (0 mass %, Comparative Example 1) was contained and mixed. The ceramic honeycomb structures having partition wall thicknesses of 75 μm, a cell density of 600 cells/square inch, a columnar outer shape, an outer diameter of 90 mm and a length of 100 mm and made of cordierite were prepared by using the resultant mixed material. All of the honeycomb structures have the same partition wall porosity of 35%.

Next, each of the obtained ceramic honeycomb structures was wash-coated with a γ-alumina component, and on the resultant coat layer, a noble metal component such as platinum, rhodium or palladium was loaded to prepare a catalyst substrate. It is to be noted that in Examples 1 to 3, catalyst loading amounts were set to an equal amount. Next, the obtained catalyst substrate was held in a metal container with a ceramic fiber mat, to prepare a catalyst converter. Then, the obtained catalyst converter was connected to an exhaust tube of a vehicle on which a 4-cylinder gasoline engine was equipped, and an emission measurement test was conducted by U.S. typical exhaust gas regulation mode LA-4.

By this purification performance test, there were confirmed that with the content of tungsten carbide increased, temperature rise was accelerated at cold start or hot start, and an HC purification ratio tended to increase. Results of total HC emissions (discharge amounts) are shown in Table 4.

Examples 4 to 6

To powder of a cordierite forming raw material, 0.1 mass % (Example 4), 15 mass % (Example 5) or 40 mass % (Example 6) of tungsten carbide was contained and mixed. The ceramic honeycomb structures (used as DPFs) each having partition wall thicknesses of 310 μm, a cell density of 300 cells/square inch, a columnar outer shape, an outer diameter of 144 mm and a length of 152 mm, having both end faces thereof plugged in a checkered pattern and made of cordierite were prepared by using the resultant mixed material. All of the honeycomb structures have the same partition wall porosity of 60%.

Examples 7 to 9

Ceramic honeycomb structures (used as DPFs) were prepared in the same manner as in Examples 4 to 6, and a forced regeneration test was conducted. Specifically, each obtained ceramic honeycomb structure was attached to a soot generator device for generating a particulate matter (PM) by a burner using a light oil as a fuel, and a burner exhaust gas at about 200° C. was introduced. Afterward, soot was deposited in the ceramic honeycomb structure, and the soot depositing amount was successively increased to 5 to 15 g/L per unit volume of the ceramic honeycomb structure. Then, the exhaust gas at 650 to 700° C. was introduced into the ceramic honeycomb structure, and the deposited soot was burnt.

When the soot deposited in the ceramic honeycomb structure (used as the DPF) was burnt, a maximum temperature was generated around the center of the exhaust gas outlet end face of the ceramic honeycomb structure. According to this forced regeneration test, it was confirmed that with the increase of the content of tungsten carbide, the maximum temperature around the center of the exhaust gas outlet end face of the structure tended to decrease.

Examples 10 to 12, Comparative Examples 2 to 5

To powder of a cordierite forming raw material, 0.1 mass % of copper (Comparative Example 2), 0.1 mass % of iron (Comparative Example 3), 0.1 mass % of nickel (Comparative Example 4), 0.1 mass % of titanium (Comparative Example 5), 0.1 mass % of chromium (Example 10), 0.1 mass % of molybdenum (Example 11) or 0.1 mass % of tungsten carbide (Example 12) was contained and mixed. The ceramic honeycomb structures having partition wall thicknesses of 75 μm, a cell density of 600 cells/square inch, a columnar outer shape, an outer diameter of 90 mm and a length of 100 mm and made of cordierite were prepared by using the resultant mixed material.

Whether the reaction of the substance mixed with cordierite was occurred or not was inspected by visual observation of the appearance and cut inside of each obtained ceramic honeycomb structure and the observation thereof by a microscope. Results are shown in Table 3. When holes were formed, it was judged to be bad because of the occurrence of the reaction there between the substance and cordierite. When color changed (in a portion which was regarded as the periphery of the mixed substance), it was judged to be acceptable because of a slight occurrence of the reaction there between the substance and cordierite. When there was not any hole or color change, it was judged to be good because of no occurrence of the reaction there between the substance and cordierite.

TABLE 3

| | Contained substance | Melting point (° C.) | Evaluation |
|---|---|---|---|
| Comparative Example 2 | Copper | 1085 | bad (holes formed) |
| Comparative Example 3 | Iron | 1535 | bad (holes formed) |
| Comparative Example 4 | Nickel | 1455 | bad (holes formed) |
| Comparative Example 5 | Titanium | 1668 | acceptable (color change of periphery) |
| Example 10 | Chromium | 1903 | good |
| Example 11 | Molybdenum | 2623 | good |
| Example 12 | Tungsten | 3422 | good |

TABLE 4

| | Content of tungsten carbide [mass %] | Total HC emission [g/mile] |
|---|---|---|
| Example 1 | 0.1 | 0.037 |
| Example 2 | 5 | 0.030 |
| Example 3 | 10 | 0.026 |
| Comparative Example 1 | 0 | 0.049 |

(Discussion) When copper or iron having a melting point lower than that of cordierite or nickel having a melting point substantially equal to that of cordierite was mixed and fired with the cordierite forming raw material, the material reacted with and melted cordierite, whereby rough and macro pores were formed. On the other hand, when the substance had a melting point of 1600° C. or more, the color change was partially seen, but any macro pores were not formed in cordierite. In particular, when the substance had a melting point of 1900° C. or more, there was not any color change, and any macro pores were not formed in cordierite.

The ceramic honeycomb structure according to the present invention can preferably be used as a catalyst substrate or a filter for purifying an exhaust gas discharged from various internal combustion engines, typified by the exhaust gas discharged from a car; a filter for various filter devices; a substrate for a chemical reaction device, for example, a substrate of a reforming catalyst for a heat exchange unit or a fuel cell; or an adsorber or an absorber of hydrogen, carbon dioxide or the like.

The invention claimed is:

1. A ceramic honeycomb structure comprising:
    porous partition walls which form a plurality of cells as through channels for a fluid; and
    an outer wall which surrounds the partition walls;
    wherein the partition walls contain cordierite and a substance having a larger heat capacity and a higher thermal conductivity compared with those of the cordierite of the partition walls, wherein the substance having a larger heat capacity and higher thermal conductivity than that of the cordierite of the partition walls is mixed with cordierite-forming materials and fired to form the partition walls, and wherein the substance having a larger heat capacity and higher thermal conductivity is a material selected from the group consisting of chromium, molybdenum, and tungsten carbide.

2. The ceramic honeycomb structure according to claim 1, further comprising:
    plugging portions which plug open areas of predetermined cells in one end face side and open areas of the residual cells in the other end face side among the plurality of cells,
    wherein the plugging portions are provided so that the predetermined cells and the residual cells are alternately disposed.

3. The ceramic honeycomb structure according to claim 1, wherein a content of the substance having a larger heat capacity and a higher thermal conductivity than that of the cordierite of the partition walls is 5 to 40 mass % with respect to a mass of the cordierite of the partition walls.

* * * * *